(12) United States Patent
Olin (10) Patent No.: US 7,197,953 B2
(45) Date of Patent: *Apr. 3, 2007

(54) IMMERSIBLE THERMAL MASS FLOW METER

(75) Inventor: John George Olin, Carmel Valley, CA (US)

(73) Assignee: Sierra Instruments, Inc., Monterey, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/270,154

(22) Filed: Nov. 9, 2005

(65) Prior Publication Data

US 2006/0053911 A1 Mar. 16, 2006

Related U.S. Application Data

(62) Division of application No. 10/817,319, filed on Apr. 2, 2004, now Pat. No. 6,971,274.

(51) Int. Cl.
*G01D 21/00* (2006.01)
*G01F 1/68* (2006.01)

(52) U.S. Cl. .................... 73/866.5; 73/204.22
(58) Field of Classification Search ............... 73/866.5, 73/204.22, 204.24
See application file for complete search history.

(56) References Cited

U.S. PATENT DOCUMENTS 5,726,624 A   3/1998   Caffee et al.
5,780,736 A   7/1998   Russell
5,780,776 A   7/1998   Noda
5,879,082 A   3/1999   Smitherman et al.
5,880,365 A   3/1999   Olin et al.
5,999,081 A   12/1999  Hannigan et al.
6,628,202 B2  9/2003   McQueen et al.
6,666,578 B2  12/2003  Gibbs et al.

FOREIGN PATENT DOCUMENTS

JP   54-89679      *  7/1979
JP   2000-155055   *  6/2000

OTHER PUBLICATIONS

John G. Olin, Section 29.2 entitled "Thermal Anemometry" in The Measurement Instrumentation and Sensors Handbook, 1999, 29-18 to 29-37, CRC Press LLC, USA.

* cited by examiner

*Primary Examiner*—Harshad Patel
(74) *Attorney, Agent, or Firm*—Frank P. Becking (57) ABSTRACT

A thermal anemometer or mass flow meter having temperature and flow velocity sensor elements is provided in which a thin film temperature sensor is provided in the heated sensor of the fluid velocity sensor element of the system. The thin-film sensor is captured at least partially within a spacer or interface member, the spacer being received within a housing. The thermal anemometer is constructed to offer sufficient precision and accuracy in its design to be suitable for sensitive scientific and industrial applications. This goal is achieved while using cost effective parts—as in the thin film temperature sensor(s)—in connection with a construction approach minimizing or eliminating gaps or other system configuration variability.

14 Claims, 6 Drawing Sheets

Flow Point

IMMERSIBLE THERMAL MASS FLOW METER

FIELD OF THE INVENTION

This invention relates to mass flow meters, particularly regarding their manufacture at decreased cost, yet of such quality for critical applications.

BACKGROUND OF THE INVENTION

The mass flow rate of a fluid (defined by its average velocity multiplied by its mass density multiplied by the cross-sectional area of the channel through which the flow travels) is a measured quantity of interest in the control or monitoring of most practical and industrial applications, such as any chemical reaction, combustion, heating, cooling, drying, mixing, fluid power, etc. Generally speaking, a thermal anemometer is used to measure the mass velocity at a point or small area in a flowing fluid—be it liquid or gas. The mass velocity of a flowing fluid is its velocity referenced to standard or normal temperature and pressure. The mass velocity averaged over the flow channel's cross-sectional area multiplied by the cross-sectional area is the standard or normal volumetric flow rate through the channel and is a common way of expressing the total mass flow rate through the channel.

The thermal anemometer is sometimes referred to as an immersible thermal mass flow meter because it is immersed in a flow stream or channel in contrast to other thermal mass flow meter systems, such as those which sense the total mass flow rate by means of a heated capillary tube mounted externally to the flow channel. The operational principles of thermal anemometers derives from the fact that a heated sensor placed in a fluid stream transfers heat to the fluid in proportion to the mass flow rate of the fluid. In a thermal anemometer, one such heated sensor is provided together with another sensor that detects fluid temperature. In the constant-temperature mode of operation, the heated sensor is maintained at a constant temperature above the fluid temperature. The temperature difference between the flowing fluid and the heated sensor results in an electrical power demand in maintaining this constant temperature difference that increases proportional to the fluid mass flow rate and that can be calculated. Alternately, some thermal anemometers operate in a constant-current mode wherein a constant current or power is applied to the heated sensor and the fluid mass flow rate is calculated from the difference in the temperature of the heated sensor and the fluid temperature sensor, which decreases as mass flow rate increases. Thermal anemometers have greater application to gases, rather than liquids, because their sensitivity in gases is higher than in liquids.

Because the parts of the heated sensor of known thermal anemometers are not sufficiently reproducible dimensionally or electrically, known thermal anemometers require multipoint flow calibration of electrical output versus mass flow rate, usually in the actual fluid and with the actual ranges of fluid temperature and pressure of the application. For industrial applications, the heated sensor and fluid temperature sensor of known thermal anemometers typically have their respective sensors encased in a protective housing (e.g., thermowell or metallic tube sealed at its end, etc.). Usually, the encased heated sensor is inserted into the tip of the housing and is surrounded by a potting compound, such as epoxy, ceramic cement, thermal grease, or alumina powder.

In such a system, "skin resistance" and stem conduction are two major contributors to non-ideal behavior and measurement errors in thermal anemometers constructed in this manner. Skin resistance is the thermal resistance between the encased heated sensor and the external surface of the housing exposed to the fluid flow. The well-known hot-wire thermal anemometers have zero skirt resistance, but thermal anemometers with a housing do have skin resistance. The use of a potting compound substantially increases the skin resistance because such potting compounds have a relatively low thermal conductivity.

Skin resistance results in a temperature drop between the encased heated sensor and the external surface of the housing which increases as the electrical power supplied to the heated sensor increases. Skin resistance creates a "droop" and decreased sensitivity in the, power versus fluid mass flow rate calibration curve which is difficult to quantify and usually varies from meter to meter because of variations both in the parts of construction and in installation. The ultimate result of these skin-resistance problems is reduced accuracy. Furthermore, the use of a surrounding potting compound can create long-term measurement errors caused by aging and by cracking due to differential thermal expansion between the parts of the heated sensor.

Stem conduction causes a fraction of the electrical power supplied to the encased heated sensor to be passed through the stem of the heated sensor, down the housing, lead wires, and other internal parts of the heated sensor, and ultimately to the exterior of the fluid flow channel. Stem conduction couples the electrical power supplied to the encased heated sensor to the ambient temperature outside the channel. If the ambient temperature changes, stem conduction changes, and measurement errors occur. Similarly, stem conduction is responsible for errors in the encased fluid temperature sensor's measurement because it too is coupled to the ambient temperature.

Further discussion of the operational principles of known immersible thermal mass flow meters, their several configurations, particular advantages, uses, skin resistance, and stem conduction are presented in section 29.2 entitled "Thermal Anemometry" by the inventor hereof as presented in *The Measurement Instrumentation and Sensors Handbook*, as well as U.S. Pat. Nos. 5,880,365; 5,879,082; and 5,780,736, all assigned to Sierra Instruments, Inc., and each incorporated by reference herein in its entirety.

As noted in the referenced material, resistance temperature detectors (RTDs) may be employed in the heated sensor and the fluid temperature sensor, when one is provided. Alternative sensors for either the heated sensor or the fluid temperature sensor include thermocouples, thermopiles, thermistors, and semiconductor junction thermometers. RTD sensors are generally recognized as being more accurate and stable than any of these alternatives.

RTD sensors operate on the principle of electrical resistance increasing in accordance with increasing temperature. In known thermal anemometers, the RTDs are provided most commonly in the form of wire-wound sensors, but also as thin-film sensors (such as provided on an alumina chip) and least commonly as micro-machined sensors (such as provided in a silicon wafer). The most common wire-wound RTD sensors are usually manufactured via hand winding and hand resistance trimming, as well as other manual operations. This makes them vulnerable to human error in production and subject to irreproducibilities. The labor content, as well as the high cost of platinum wire, make them quite costly. Variations in the dimensions of the circular mandrel (e.g., alumina) over which the wire is typically wound and the insulating coating (e.g., glass) over the wound wires cause further dimensional and electrical-resistance irreproducibilities in wire-wound RTD sensors. Micro-machined RTD sensors have even worse dimensional and electrical resistance tolerances. As such, neither type of sensor is ideal for use in thermal anemometers.

On the other hand, thin-film RTD sensors are mass produced using automated production operations, employing technologies such as photolithography and lasers. This results in the comparatively high reproducibility, accuracy, stability, and cost-effectiveness of thin-film RTD sensors. Yet, prior to the teaching offered by the present invention, some thermal anemonmeters have used thin-film RTD's that were not entirely encased in a protective housing and which had their surfaces directly exposed to the fluid. Due to the fragility, poorer dimensional tolerances, and the oscillating and turbulent flow around the thin-film RTD body, etc., such devices—standing alone—have only proven suitable for light duty, low-end, low-accuracy/precision requirement applications.

Prior to the solution offered by the present invention, the best accuracy typically achievable in current thermal anemometers for industrial applications was approximately 2% to 3% of reading error in accuracy over a mass flow rate range of 10% to 100% of full scale and over a relatively smaller temperature and pressure range. The construction of the heated sensor selected is what limits the accuracy. Most commonly, a wire-wound RTD sensor and, less commonly, a thin-film RTD sensor is encased in the tip of a metallic tube (e.g., 316 stainless steel) sealed at its end and surrounded by a potting compound (e.g., epoxy, ceramic cement, thermal grease, or alumina powder).

Sensor fabrication with such potting compounds is inherently irreproducible due to variations in their composition, amount used, insufficient wetting of surfaces, and/or air bubbles. In the case of wire-wound sensors, this irreproducibility is added to previously mentioned irreproducibilities associated with wire-wound RTD sensors themselves. These irreproducibilities, combined with the previously mentioned high skin resistance and potential for long-term instability associated with the use of potting compounds, limits the overall accuracy of known thermal anemometers constructed in this manner.

The thermal anemometer described in U.S. Pat. No. 5,880,365 avoids the accuracy degrading use of potting compounds by forming the encasing housing over the wire-wound RTD sensor by means of forces external to the housing. This construction has high stability and improved accuracy but is relatively expensive and may have irreproducibilities associated both with wire-wound RTD sensors and with variations from meter to meter in the gap between the wire-wound RTD and the internal surface of the housing.

However, the present invention employs a thin-film RTD not prone to such problems. It does so in a manner not heretofore contemplated, thereby offering the advantage of the sensor type's relative benefits, but in a highly accurate meter. As such, the present invention offers a significant advance in the art.

SUMMARY OF THE INVENTION

Where a thermal anemometer is desired for use in a given application, the quality of the device may be quite significant. The present invention offers a mode of device construction or packaging in connection with thin-film RTD sensors (TFRTD) that is able to leverage the cost advantage offered by such products, but still attains and improves the measurement quality required of scientific and industrial applications. Namely, systems according to the present invention offer performance with as low as 1% to 1.5% or 2% of reading error in accuracy over a mass flow rate range of 10% to 100% of full scale (or larger) and over a relatively larger fluid temperature and pressure range.

When coupled with computations based on heat-transfer correlations and other corrective algorithms, reducing the dimensional and electrical (e.g., resistance) tolerances of the parts of the heated sensor as is possible with the present invention yields important cost-reducing and accuracy-enhancing benefits. These potential benefits include: fewer flow calibration points required; calibration with a low-cost surrogate flow calibration fluid (e.g., air for other gases); and better accuracy over wider ranges for mass flow rate, fluid temperature, and fluid pressure. In the ultimate case of negligible tolerances (i.e., perfect reproducibility), no flow calibration whatsoever is required.

To achieve one or more of these benefits, the present invention provides an approach for using a TFRTD temperature sensor(s) in an immersible thermal mass flow meter. The meter may be configured in connection with relevant hardware for use as an insertion or as an in-line type device. The meters include temperature and velocity sensor-elements. The velocity sensor-element has a heated TFRTD sensor and may also include a secondary temperature sensor to enable compensation for stem conduction. The temperature sensor element may also include a second temperature sensor for stem-conduction compensation as described in U.S. Pat. No. 5,879,082. The meter's sensor elements are typically used in connection with a programmed general-purpose computer or dedicated electronic control hardware—either example of such hardware including a data processor.

In each variation of the invention, the heated sensor in the velocity sensor element is a TFRTD sensor. Although the preferred embodiment of the present invention uses TFRTDs for the remaining temperature sensors in both the velocity sensor element and the temperature sensor element, alternative types of temperature sensors can be used in these locations.

Means of producing the heated TFRTD of the velocity sensor element include printed circuit technology, photolithography, laser milling, and MEMs approaches, etc., whereby a temperature sensing element is provided on a silicon wafer, by thin-film platinum, nickel, or other metal on an alumina or other electrically insulating chip, or otherwise. By virtue of the manner in which the heated TFRTD is held or captured within the velocity sensor element, spacing or gaps between it and adjacent thermally conductive material are minimized or effectively eliminated.

In the subject heated TFRTD of the velocity sensor element of mass flow meters according to the present invention, an outer layer is provided by a housing that captures a spacer or interface member (gland), that—in turn—captures the TFRTD. During manufacture, gaps between the TFRTD and the spacer adapted to receive the same are minimized or eliminated using a method in which the ductile metal forming the spacer is compressed around or about the TFRTD. Such an approach may take place prior to insertion or encasement of the spacer into an outer housing (e.g., thermowell or tube).

Beyond selecting a ductile material for the spacer, certain other material-choice considerations, in any combination, may be considered pertinent. For one, the spacer material may have a high thermal conductivity in order to minimize skin resistance and to provide a more uniform axial temperature distribution along the length of the spacer, thereby simplifying the use of heat-transfer correlations and other corrective algorithms for the velocity sensor element. For another, it may be desirable to produce the spacer from powdered metal for the sake of economy in producing the desired shape. Alternatively, the spacer material may be selected in coordination with that of the housing and TRFTD in order to match or substantially match thermal expansion properties.

In any case, the approach to heated TFRTD capture within the tightest tolerances using an interface member is a major reason why the velocity sensor element—and thus—thermal anemometers according to the invention offer the requisite accuracy and precision for industrial and scientific applications. Yet, it is the inexpensive nature, reproducible dimensions and electrical characteristics of using a thin-film RTD temperature sensor (at least as the heated sensor of the velocity sensor element) that make systems according to the present invention economical.

The tangible benefits to users of immersible thermal mass flow meters according to the present invention may include reduced cost, higher accuracy, and higher stability than know alternatives. The features of the invention yield these benefits by solving the problems of known thermal anemometers described in the Background section above as follows: the use of a TFRTD as the heater of the velocity sensor element reduces cost and enhances reproducibility issues; the high thermal conductivity interface member assembled with minimal gaps reduces skin resistance and simplifies the use of heat-transfer correlations and corrective algorithms; the "dry" sub-assembly of the heated sensor of the velocity sensor element fabricated without the use of potting compounds increases long-term stability and reproducibility; an additional optional temperature sensor in the velocity sensor element and/or temperature sensor element compensates for stem conduction. In the above features improved reproducibility yields the benefit of reduced costs; simplified heat-transfer correlations and corrective algorithms yield the benefits of better accuracy and reduced cost; and reduced skin resistance and stem-conduction compensation both yield the benefit of better accuracy.

In sum, the present invention includes systems comprising any of the features described herein. As for these features and possible advantages enjoyed in connection therewith, only the use of at least one TFRTD is required in the invention. All other advantageous aspects are optional. Methodology, especially in connection with manufacture, also forms part of the invention.

BRIEF DESCRIPTION OF THE DRAWINGS

Each of the figures diagrammatically illustrates aspects of the invention. Of these.

Variation of the invention from that shown in the figures is contemplated. Fluid flow direction is indicated in many of the figures by arrows.

DETAILED DESCRIPTION

Before the present invention is described in detail, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein;

All existing subject matter mentioned herein (e.g., publications, patents, patent applications and hardware) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

Figure 1A:
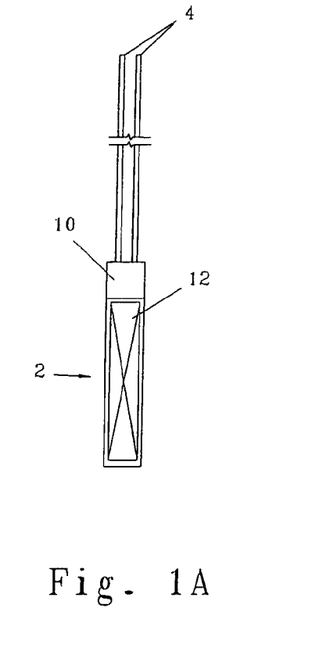
FIGS. 1A and 1B show front and side views, respectively, of a thin-film RTD (TFRTD) sensor element.
Figure 1B:
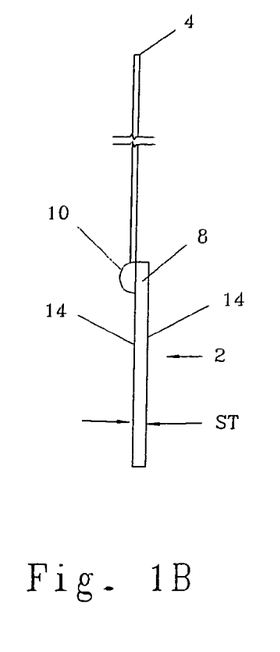

Turning now to FIGS. 1A and 1B, these show a view of the type of temperature sensor 2 employed in the present invention. The sensor shown is a "thin film" type sensor as described above. The particular sensor shown is a thin-film Platinum Resistance Temperature Detector (PRTD) as commonly available. An active region 12 of the device is provided, over which area the PRTD is self-heated by current during use. Sensor 2 includes lead wires 4 connected to weld pads leading to active region 12 and covered by a glass strain relief 10. The body 8 of the sensor is made of high-purity alumina, preferably held to a thickness tolerance within about ±0.002 to 0.001 inches as commonly available. A thin layer of glass electrical insulation is provided over the PRTD active area. Of course, the PRTD is only exemplary as other such TFRTDs may be employed in the invention.

Figure 2A:
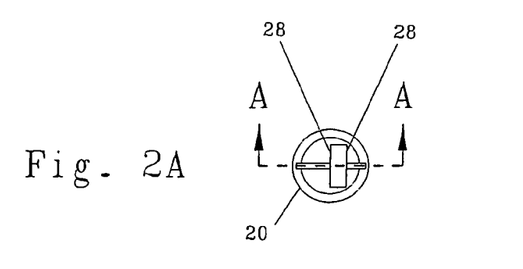
FIGS. 2A and 2B show an end view and a'side sectional view taken along line A—A of a spacer interface member for the temperature sensor shown in FIGS. 1A and 1B.
Figure 2B:
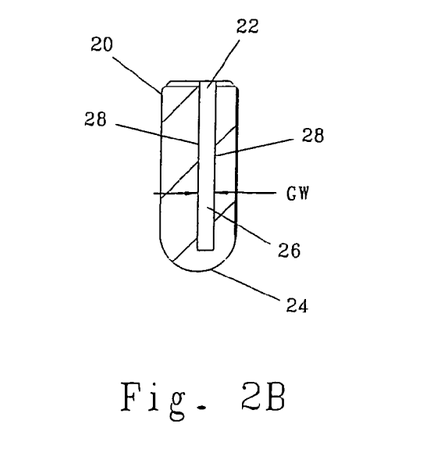

FIGS. 2A and 2B, show a member for receiving the RTD therein. The interface member or spacer 20 comprises a metal such as copper. The material should be highly thermally conductive. For example, other metals and alloys (such as bronze) including aluminum, aluminum alloy, silver, gold, alloys thereof, etc. could be employed.

Spacer 20 is advantageously constructed of molded powdered metal. In that manner it is cost-effectively constructed to define a hole or bore 22 suited to closely fit temperature sensor 2. Other techniques, such as broaching and electric discharge machining, may be employed in producing the part. However, as a molded powdered metal piece, the item is inexpensive to produce.

Still further, as a powdered metal piece, the inventor hereof observed an unexpected result. Namely, when the sensor was inserted into the hole, any gap between the sensor and the bore is permanently collapsed by squeezing the exterior of the spacer in a simple chuck. Such ease of plastic deformation of the piece is believed (at least in part) to result from the nature of the powdered metal matrix.

Yet, whether the spacer is a powdered metal piece or otherwise formed, more aggressive forming techniques can be applied to reduce any gaps between the sensor and facing material. Particularly, a hydroforming procedure such as described in the '365 patent referenced above may be employed. It should be noted that such forming techniques should not apply forces on sensor 2 sufficient to generate electrical resistance changes caused by strains in sensor number 2. Our tests have shown that with simple mechanical compression of a powdered metal copper spacer and release from the compression, sensor 2 is not easily pressed from hole 22 (when opened at a distal end 24 to allow such action).

Accordingly, it has been surmised that one or more points or sub-areas of the two larger-area surfaces 28 of the hole 22 in spacer 20 are touching mating points or sub-areas of the two larger-area surfaces 14 of temperature sensor 2, thereby clamping temperature sensor 2, with forces substantially normal to the sensor, in an immovable position relative to the spacer 20 and insuring long-term stability of the subassembly. The gaps between the two smaller-area surfaces of the hole 22 and the two smaller-area surfaces of the temperature sensor 2 may be designed to be relatively larger and thereby have little effect in the compression process.

It is further surmised, based on material variations and testing, that the total gap—the sum of the gap between one surface 28 of the hole 22 and its mating surface 14 of the temperature sensor 2 and the gap between the second pair of such surfaces—ranges from about 0.003 inches to 0.0005 inches (and where mating surfaces touch even smaller) and likely averages about 0.001 inches. That is to say, the sensor thickness "ST" and gap width "GW" as shown in FIGS. 1B and 2B respectively differ by between about 0.0005 and 0.003 inches, or on average about 0.001 to about 0.002 inches. Yet another way to view the interaction is in terms of a resulting close fit or light press fit tolerances as commonly understood by those with skill in the art.

Figure 3:
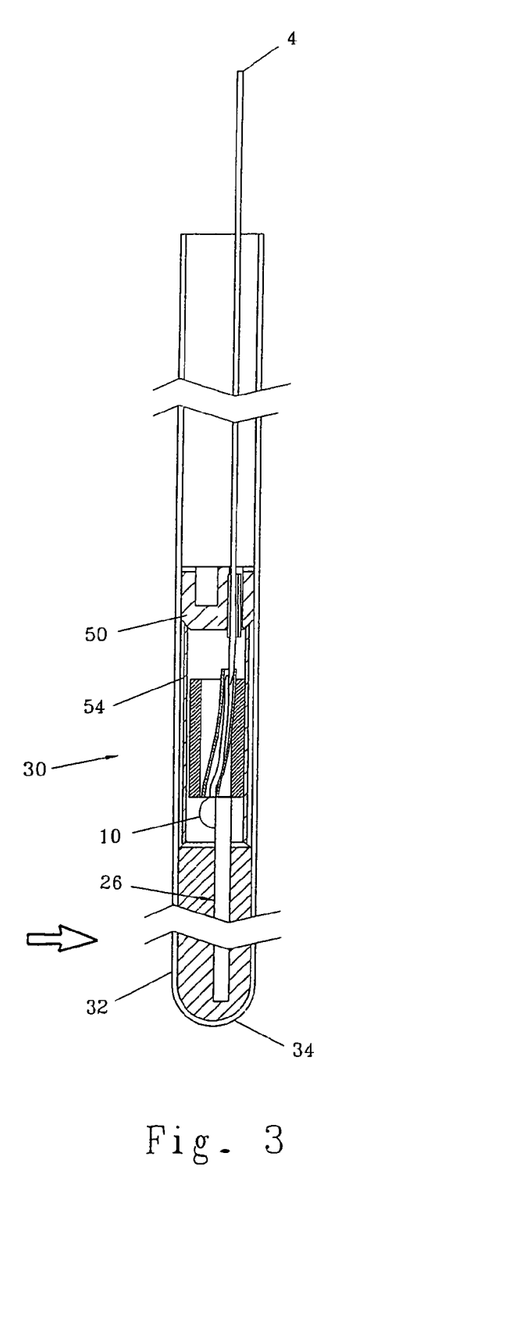
FIG. 3 is a partial side-sectional view of a velocity sensor element in accordance with the present invention incorporating the hardware shown in FIGS. 1A–2B.

In the present invention, spacer 20 provides an intermediate member between sensor 2 and the shell housing 32 of the velocity sensor element 30. In the '365 patent, it is the housing that is externally pressure formed. In the present invention, no such activity occurs in connection with the housing. Instead, spacer 20 (together with sensor 2) is press-fit into the housing. The rounded distal end 24 of spacer 20 is pressed into a complimentary distal section 34 of housing 32. In this manner, gaps along the outer surface of the bullet-shaped spacer subassembly are substantially eliminated.

The fit between the spacer and its housing may be designed as a close fit, a light press fit or even a heavy press fit. In the latter cases, the housing exerts a radial force on the spacer subassembly. This force may supplement any previously-applied compression to the spacer 20 onto temperature sensor 2 or it may instead offer the only compression onto temperature sensor 2 applied in some cases.

Seeing as a goal of the spacer is to eliminate gaps (which are more than an order of magnitude less thermally conductive than the desired metal material) that increase skin resistance and thereby decrease system accuracy and introduce variability interfering with modeling of the system, the shape of bore 22 will depend on the shape of the sensor. Regardless of the sensor shape, it is preferred that at least the portion 26 of the spacer facing the active surface 12 of the RTD be shaped to facilitate direct and at least substantially complete abutment of the surfaces.

Still further, it is to be appreciated that the inventive system is one in which no significant amount of fillers or potting material such as epoxy, ceramic cement, thermal grease, alumina powder, or another agent or compound is provided between sensor 2, spacer 20, and housing 32 of velocity sensor element 30. This factor is important since introduction of such material introduces in quantity (or at all) may introduce irreproducibilities in the velocity sensor element. It may further introduce instability, for example, by virtue of differential expansion during temperature cycling. Still, one might add a very thin layer of thermally conductive material, otherwise used as "potting compound" to all gaps in effort to reduce skin resistance between elements. However, such a film, veneer or wetting of components (likely performed prior to their assembly) is different, in kind, to immersing or traditionally "potting" an item in such material.

On another front, due to thermal cycling it is also desirable that at least spacer 20 and housing 32 have substantially or approximately matched coefficients of thermal expansion. Such a result is possible in the case of a pairing of copper and stainless steel for the spacer and housing, respectively.

Of course, other materials may be selected. Yet, the copper/stainless combination has proven highly advantageous by virtue of the ductility of the copper in the forming procedure of the spacer against sensor 2 and further with respect to the good material thermal expansion rate match the selection provides.

Figure 4A:
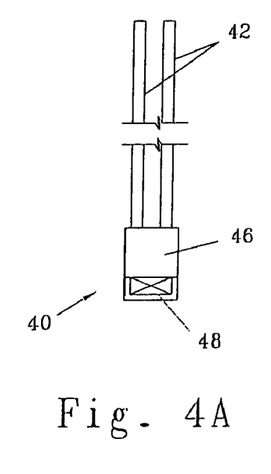
FIGS. 4A and 4B show front and side views, respectively, of another temperature sensor as may be used in the present invention.
Figure 4B:
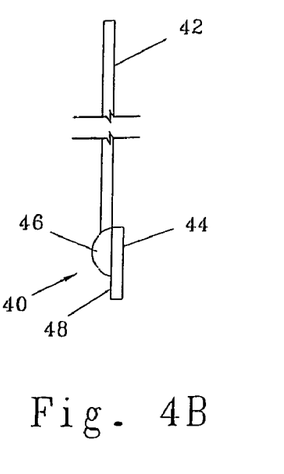

As for further optional features of the invention, reference is made to FIGS. 4A and 4B. Here, a second RTD 40 is shown. Like that shown in FIGS. 1A and 1B, it includes leads 42, a substrate 44, strain relief 46, and active area 48. Yet, this sensor is not self-heated. It is intended merely to measure temperature. When optionally used in the velocity sensor element 30, its purpose is to offer compensation for stem conduction as is known possible in the art as possible in theory. However, the hardware implementation offering potential for such calculations is unique to the present invention.

Figure 5:
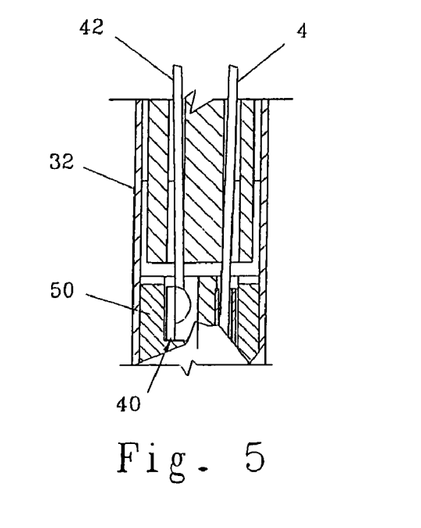
FIG. 5 shows a partial sectional view of the velocity sensor element including the sensor in FIGS. 4A and 4B housed therein to provide compensation for stem conduction.

In addition to such other facets as one with skill in the art will appreciate upon review of the present disclosure, FIG. 5 illustrates the desired placement of sensor 40 within the body of velocity sensor element 30, in which the adjacent housing 32 of velocity sensor element 30 is in the full fluid flow stream substantially identical to that of heated sensor 2. The use of sensor 40 to compensate for stem conduction is greatly simplified if the distal length of the velocity sensor element 30 from its far distal tip to the active area of sensor 40, called the "active length," is in the full fluid flow with a velocity profile over said active length that is substantially uniform. These same considerations also are applicable to the location of the second temperature sensor 70 in FIG. 7 for stem conduction compensation in the temperature sensor element 56. Nevertheless, the present invention encompasses, but with reduced accuracy for stem conduction compensation, the placement of sensor 40 at any location within the velocity sensor element, including more proximal locations, including within the cavity noted by location 81 in FIG. 8 or even at the base of the velocity sensor element within sensor head 80 as noted by location 83 in FIG. 8. Yet, in a preferred variation of the invention, the housing 32 of velocity sensor element 30 that is adjacent to sensor 40 is in the full flow stream because then the computations associated with determining mass flow are comparably simple or elegant.

Figure 6:
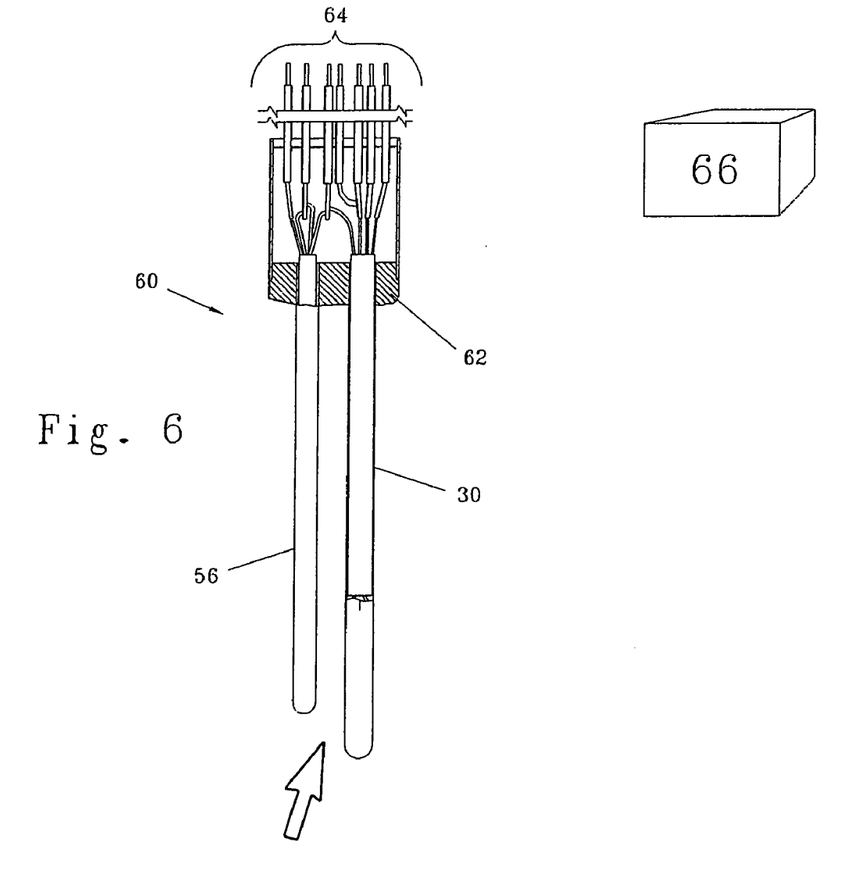
FIG. 6 shows a partial side-sectional view of a complete thermal anemometer sensor assembly including velocity and temperature sensor elements according to the present invention.

FIG. 5 offers a cross-sectional view of the highlighted section of the velocity sensor element in FIG. 6. In this sectional view, the cavity in ferrule piece 50 into which sensor 40 is fit is shown filled with the sensor. For the sole purpose of improving the thermal contact between sensor 40, ferrule 50, and housing 32, a potting compound such as thermally conductive epoxy or ceramic cement may surround sensor 40 in the cavity of ferrule 50. It should be observed that said potting compound is outside of the velocity sensing length of the velocity sensor element, and therefore any of its previously described negative features do not affect accuracy or long-term stability. In FIG. 3, no such sensor is provided, illustrating the optional nature of the sensor.

While including the sensor 40 offers certain advantages in the ability to broadly provide compensation for stem conduction, it still may be desired to provide a longitudinal spacer collar 54 to carefully define the distance between ferrule 50 (for when it might carry a sensor 40) and spacer 20 which carries sensor 2.

As for the more global construction of a thermal mass flow meter according to the present invention, FIG. 6 illustrates the velocity sensor element/assembly 30 and temperature sensor element/assembly 56 provided in a greater sensor housing assembly 60. The sensor element assemblies are set within sensor head 62 with their respective leads optionally potted in epoxy, cement (or the like) with insulated wires 64 arranged for connection to a processor 66.

Figure 7:
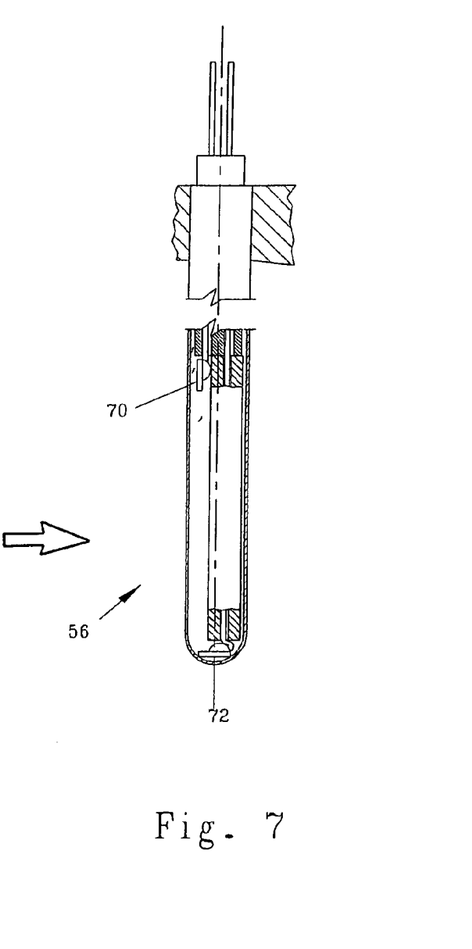
FIG. 7 shows a partial sectional view of a preferred temperature sensor element.

While such constructional details are within the level of those with skill in the art to handle without undue experimentation, FIG. 7 illustrates a particular temperature sensor element 56 as advantageously employed in the present invention. As illustrated, the assembly preferably includes two TFRTDs as shown in FIGS. 4A and 4B. The distal sensor 72 is the primary sensor for measuring the temperature of the flowing fluid. The proximal sensor 70 compensates for stem conduction as described in U.S. Pat. No. 5,879,082. In some applications, such as those involving certain liquids and certain gases at high velocity, stem-conduction errors are relatively small and in those applications proximal temperature sensor 70 is not needed. It is understood that proximal temperature sensor 70 is optional to, and is not required by, the present invention. It is further understood that, although TFRTDs are the preferred type of temperature sensor for use as sensors 70 and 72, the present invention encompasses the use, in any combination, of other types of temperature sensors such as wire-wound RTDs, thermocouples, and thermistors.

Figure 8:
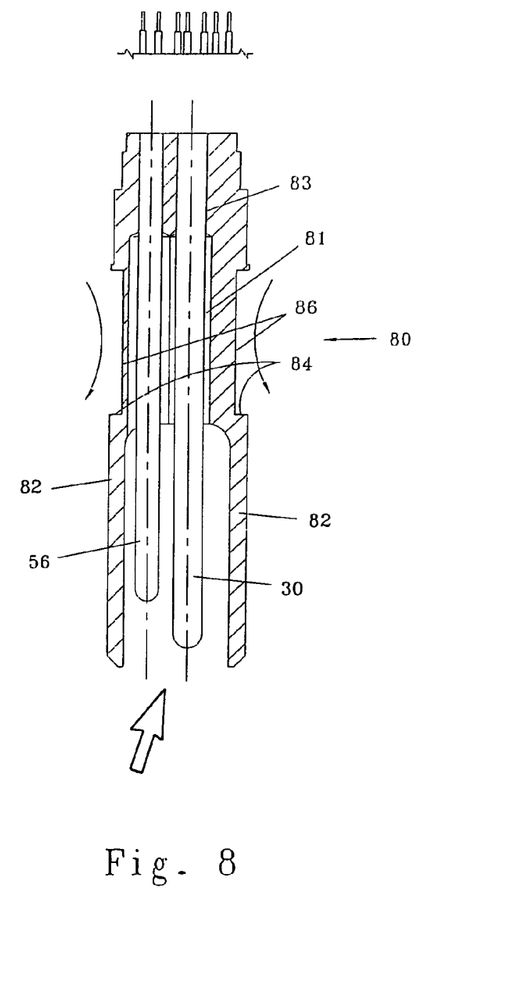
FIG. 8 shows a partial side-sectional view of a sensor head of a thermal anemometer with an insertion-type configuration according to the present invention with the assembly of FIG. 6 set therein.

Yet another advantageous innovation that may be desired for use in connection with the present invention for thermal anemometers of the insertion configuration is shown in FIG. 8. Here an open-ended protective sensor head 80 is shown in partial cross section. The sectional view reveals the placement of the velocity and temperature sensor elements in the sensor head. On either side of the sensor elements/assemblies, legs 82 defining an open channel and extending beyond the sensor elements are provided. The legs are of particular use when a technician is installing a completed meter into a pipe section or other location. The legs prevent inadvertent damage of the sensor elements during the installation procedure as well as offering protection from mishandling in the meantime. Use of a protective shield for the sensor elements of insertion thermal anemometers has precedence, but such shields normally are closed at their distal end. The shielding of sensor head 80 of the present invention is open at its end and thereby eliminates the flow disturbance created at the distal end of closed ended shields and consummates ultimately in better accuracy.

Figures 9A, 9B, 10:
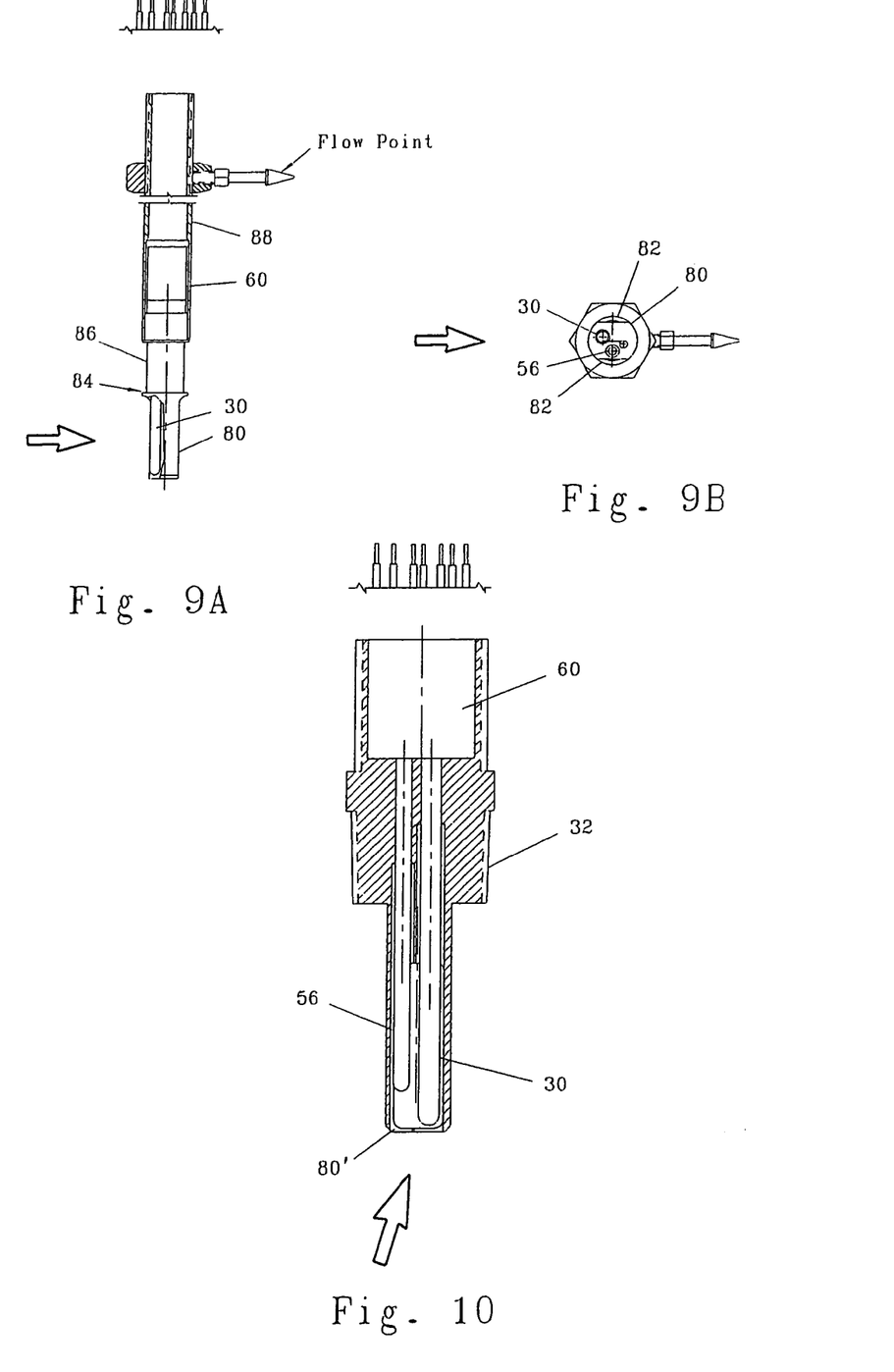
FIGS. 9A and 9B show a partial side-sectional view and an end view, respectively, of a thermal anemometer according to the present invention of the insertion-type configuration having a tubular stem.
FIG. 10 shows a partial side-sectional view of an alternative insertion-type meter configuration.

FIGS. 9A and 9B show a complete probe assembly of an insertion meter of the present invention constructed with tubular stem 88 and the sensor head 80 of FIG. 8. This meter is sealed and connected to the flow channel or stream by means of a compressing fitting, flange or other like means. The constituent elements of the system are as described and designated by numerals above. To facilitate proper installation orientation by an end-user a pointer indicating flow direction may be incorporated in the housing.

FIG. 10 shows another insertion thermal anemometer configuration of the present invention intended for applications not requiring the highest accuracy. In contrast to the insertion meter of FIGS. 9A and 9B, this meter has threaded process connection 32 and, for purposes of strength, a closed-ended protective shield 80' around the sensor elements.

Whereas the largest portion of the flow of a fluid around such known thermal anemometers of the insertion configuration flows circumferentially and perpendicularly around the meter's perpendicularly-oriented stem 88 and sensor head 80 of FIGS. 9A and 9B (head detailed in FIG. 8), nevertheless a smaller fraction is inclined to flow axially down the stem and sensor head, enter the volume between legs 82, and ultimately flow over the velocity sensor element 30. This effect can cause the meter to erroneously measure a velocity higher than the actual velocity. Since this axial flow varies with the depth of insertion into the flow stream, its magnitude during flow calibration may be different than that of the actual field application, thereby impairing velocity measurement accuracy.

Accordingly, insertion meter sensor head 80 of the present invention is designed to reduce errors caused by such axial flows. Shoulder 84 and inset 86 of sensor head 80 in FIG. 8 provide aerodynamic features to redirect and divert said axial flow circumferentially around the sensor head as indicated by the flow arrows, thereby diminishing its magnitude passing over the velocity sensor element 30 and improving velocity measurement accuracy. Furthermore, one with skill in the art of aerodynamics will recognize that one or more shoulders 84, fins, or other alternate feature configurations may be provided to redirect a portion of said axial flow circumferentially and substantially perpendicularly around the insertion probe before it passes over the velocity sensor element and causes errors. The present invention encompasses the use of such elements intended for the purpose stated and associated flow dynamic methodology.

Figure 11A:
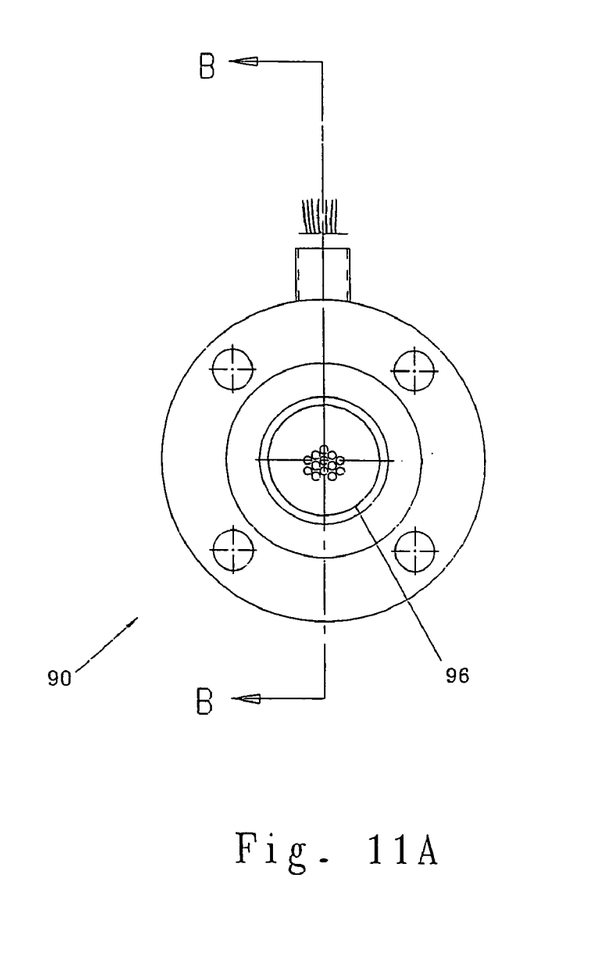
FIGS. 11A and 11B show an end view and a side-sectional view taken along line B—B, respectively, of a thermal mass flow meter according to the present invention of the in-line-type configuration.
Figure 11B:
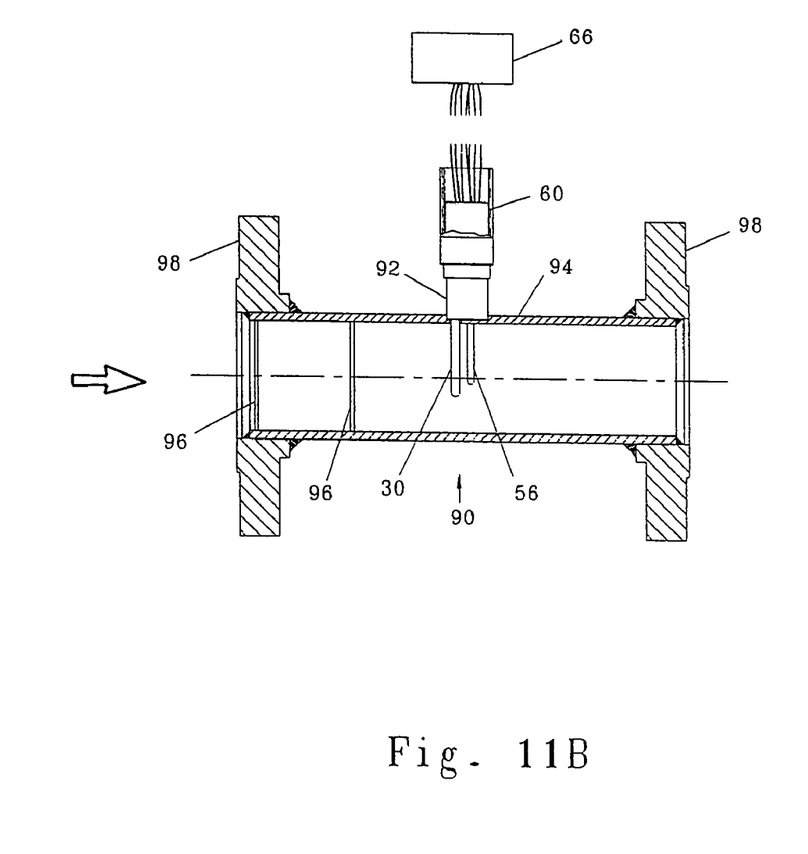

Turning to FIGS. 11A and 11B, these drawings illustrate an immersible thermal mass flow meter of the in-line configuration encompassed by the present invention. The mass flow meter assembly 90 is shown emplaced within an adapter 92 extending from pipe 94. Because the velocity sensor element 30 and the temperature sensor element 56 are intended to be enclosed within the pipe 94 as a delivered unit for in-line placement within a system, the sensors require no protective shield. In-line meter 90 is attached to the process piping by means of flanges 98. Also pictured are two perforated flow plates 96 in series and upstream of velocity sensor element 30 and temperature sensor element 56 in order that the flow reaching the same may be substantially uniform and independent of upstream pipe disturbances.

In most known insertion-type and in-line configuration immersible thermal mass flow meters the velocity sensor and temperature sensor elements are aligned substantially perpendicular to the main fluid flow stream as shown in FIGS. 11A and 11B (and as indicated by the double-line flow direction arrows in many of the preceding figures). However, the in-line meters 100 and 110 in FIGS. 12A and 12B, respectively, represent exceptions to this commonality and have their flow axial to the sensor elements. These designs are designed primarily for applications with low mass flow rates and therefore have relatively small flow channels.

Figure 12A:
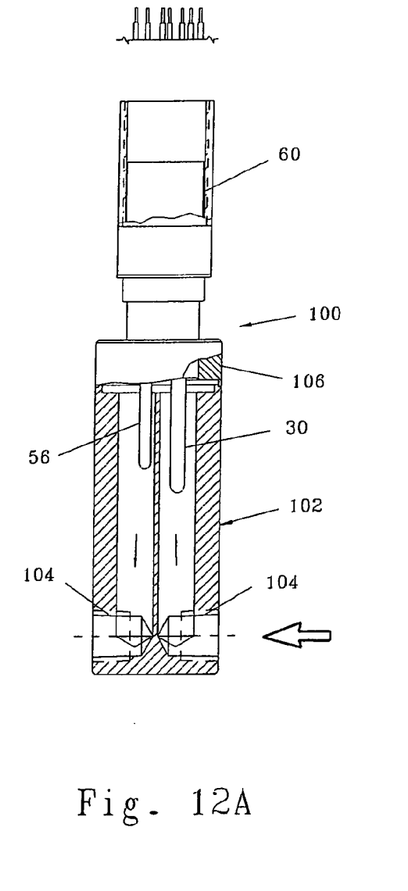
FIGS. 12A and 12B show partial side-sectional views of two alternative in-line-type configurations.
Figure 12B:
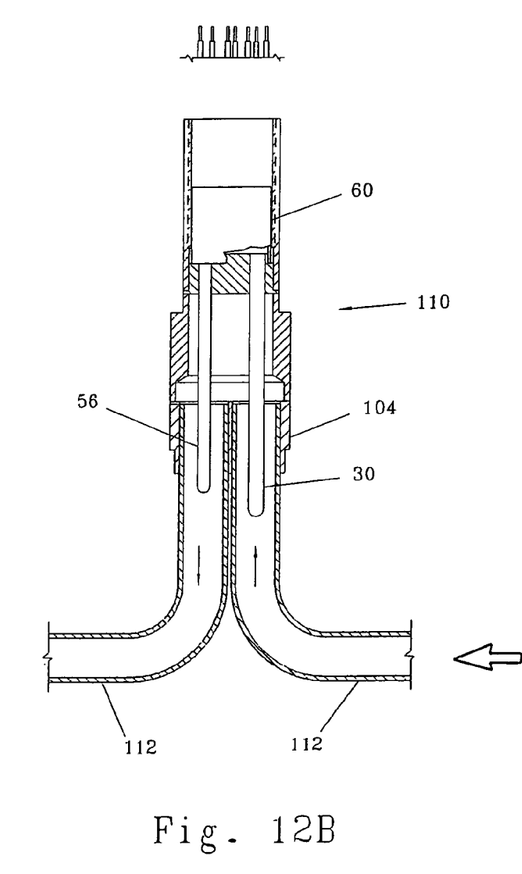

Accordingly, meter 100 in FIG. 12A has flow channels machined in flow body 102 which connect to manifold 106. Meter 110 in FIG. 12B has tubular flow channels 112 connected to manifold 104. Meter 100 has pipe-threaded process connections 104, and meter 110 has tubular process connections 112. In both of these configurations, the fluid flows axially over the sensor elements, as described in U.S. Pat. No. 5,780,776, rather than perpendicular to the sensors as in the meters previously described.

The present invention is suited for use in connection with various other flow meter configurations in addition to those shown the various figures. As for other manners in which the present invention may be implemented (i.e., housed or integrated in a flow system), these are either known or readily appreciated by one with skill in the art; further examples of which are sold by Sierra Instruments, Inc.

The thermal anemometer of the invention retains advantageous performance if operated with either digital or analog sensor-drive electronics, or with a combination of both, in either the constant-temperature or constant-current modes of operations, all as described in the above mentioned book chapter authored by the inventor hereof. Digital electronics may be preferred for reason of simplified computations based on heat-transfer correlations and corrective algorithms, that compensate for any changes (e.g., as referenced to flow calibration conditions) in the fluid itself, fluid temperature, fluid pressure, ambient temperature, and other variables and influence parameters, thereby yielding higher system accuracy. Said heat-transfer correlations and corrective algorithms are based on known empirical heat transfer correlations, specific experimental data for the thermal anemometer of the present invention, physics-based heat transfer theory, and other sources.

Though the invention has been described in reference to several examples, optionally incorporating various features, the invention is not to be limited to that which is described or indicated as contemplated with respect to each embodiment or variation of the invention. The breadth of the present invention is to be limited only by the literal or equitable scope of the following claims.

I claim:

1. An apparatus for use as a mass flow meter in a fluid, comprising:
    a spacer having cross section defining a circular diameter and a rectangular hole, said spacer adapted to closely hold a thin-film RTD temperature sensor in said hole by comprising a body selected from a powdered metal fabricated piece and a machined metal solid.

2. The apparatus of claim 1, wherein said machined solid is broached or electrical discharge machined.

3. The apparatus of claim 2, wherein said metal is selected from copper, aluminum, silver gold and alloys thereof.

4. The apparatus of claim 3, wherein said metal comprising copper is bronze.

5. An apparatus for use as a mass flow meter in a fluid, comprising:
    a velocity sensor element without potting compound comprising an elongate body for extending into the fluid, said elongate body comprising a housing shell, a distal end of said housing shell closely holding a spacer, said spacer closely holding a thin-film RTD temperature sensor, wherein said housing shell comprises steel and said spacer comprises a metal selected from copper aluminum, silver gold and alloys thereof.

6. The apparatus of claim 5, wherein said steel is stainless steel.

7. The apparatus of claim 2, wherein said metal comprising copper is bronze.

8. The apparatus of claim 5, wherein said sensor comprises an active area and electrical leads to carry current to said active area from a proximal end of said shell, said active area in substantially gap-free contact with an internal abutting spacer area.

9. A method of making an apparatus for use as a mass flow meter in a fluid, the method comprising:
    providing components as described in claim 5,
    inserting said temperature sensor in said spacer,
    compressing said spacer,
    inserting said spacer into said housing shell.

10. The method of claim 9, wherein said inserting of said spacer into said housing shell is by press-fitting.

11. The method of claim 9, wherein said compressing of said spacer follows said inserting of said temperature sensor in said spacer.

12. A method of measuring the mass flow of a fluid, the method comprising:
  providing a flowmeter comprising at least one sensor element within an elongate body for extending into the fluid;
  flowing the fluid substantially perpendicular to said body through open-ended legs of said elongate body extending along said sensor element to define a volume between said legs in which said sensor element is located; and
  diverting axial flow from along said elongate body.

13. The method of claim 12, wherein said axial flow is diverted by a feature on said elongate body.

14. The method of claim 12, wherein said legs extend beyond said sensor element.

* * * * *